(12) United States Patent
Sampathkumaran

(10) Patent No.: US 7,871,209 B1
(45) Date of Patent: Jan. 18, 2011

(54) CAMERA THAT WARNS LENS COVER STILL ATTACHED

(75) Inventor: Sriram Sampathkumaran, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/539,753

(22) Filed: Aug. 12, 2009

(51) Int. Cl.
*G03B 17/00* (2006.01)
(52) U.S. Cl. ...................................... 396/448
(58) Field of Classification Search .................. 396/448
See application file for complete search history.

(56) References Cited

U.S. PATENT DOCUMENTS

| | | | |
|---|---|---|---|
| 5,761,552 A | 6/1998 | Goto et al. | |
| 6,052,536 A * | 4/2000 | Arai et al. | 396/100 |
| 7,233,356 B2 | 6/2007 | Nagao | |
| 7,298,412 B2 | 11/2007 | Sannoh et al. | |
| 7,483,072 B2 | 1/2009 | Oikawa | |
| 7,645,078 B2 * | 1/2010 | Sugiura | 396/349 |
| 2002/0171756 A1 * | 11/2002 | Bigler et al. | 348/373 |
| 2005/0117900 A1 * | 6/2005 | Ohmori et al. | 396/448 |
| 2005/0200703 A1 * | 9/2005 | Kobayashi et al. | 348/207.2 |
| 2007/0242948 A1 * | 10/2007 | Miramontes | 396/448 |
| 2008/0019563 A1 * | 1/2008 | Goodwin et al. | 382/101 |
| 2008/0030608 A1 | 2/2008 | Yoshizawa et al. | |
| 2009/0039886 A1 * | 2/2009 | White | 324/318 |
| 2009/0109350 A1 * | 4/2009 | Koyama | 348/759 |

FOREIGN PATENT DOCUMENTS

JP 2003087642 3/2009

\* cited by examiner

*Primary Examiner*—W. B. Perkey
*Assistant Examiner*—Dennis Hancock
(74) *Attorney, Agent, or Firm*—John L. Rogitz

(57) ABSTRACT

A camera lens cover has a phosphorescent symbol on its inner surface so that if it is engaged with the camera to cover the lens, the symbol can be recognized by the camera and a warning generated that the lens cover remains over the lens.

18 Claims, 2 Drawing Sheets

CAMERA THAT WARNS LENS COVER STILL ATTACHED

FIELD OF THE INVENTION

The present application is directed generally to cameras that provide warnings to users that a lens cover remains over a lens as the user is about to take a picture.

BACKGROUND OF THE INVENTION

For a photographer with a digital camera, realizing that the lens cover is on can take time, and by the time she manages to remove it, the scene or subject of interest might no longer be within the photographers scope. Or, the photographer might never realize the cover is on at all, only to discover it later when viewing a blacked-out image. In either case, the photographer is frustrated in her desire to take a picture.

SUMMARY OF THE INVENTION

Accordingly, a camera has a housing holding a lens and an imager in the housing to receive light from the lens. A processor is also in the housing. A lens cover is removably engageable with the housing to cover and uncover the lens. The lens cover bears a phosphorescent pattern on an inner surface thereof, so that the processor can generate a first signal indicating that the lens cover is engaged with the housing to cover the lens upon recognition of the pattern. The processor does not otherwise generate the first signal.

In some embodiments the pattern is established by a sticker. In other embodiments the pattern is established by ink deposited on the inner surface.

In examples the processor compares an image represented by signals from the imager to a template to determine whether the lens cover is engaged with the housing. The signal generated by the processor upon recognition of the pattern may establish a visible warning presented on a display associated with the camera, an audio warning presented on a speaker associated with the camera, or a control signal to cause a mechanism on the camera to push the lens cover away from the camera body.

In another aspect, an apparatus includes a processor, a lens, and a lens cover movable by a photographer to cover and uncover the lens. The processor is programmed to recognize when the lens cover covers the lens and to generate a signal in response representative thereof.

In another aspect, an apparatus includes a camera lens that can be covered by a lens cover even when a photographer intends to take a picture with the camera. To ameliorate this, a processor causes a visible or audible warning to the photographer that the lens cover remains over the lens.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
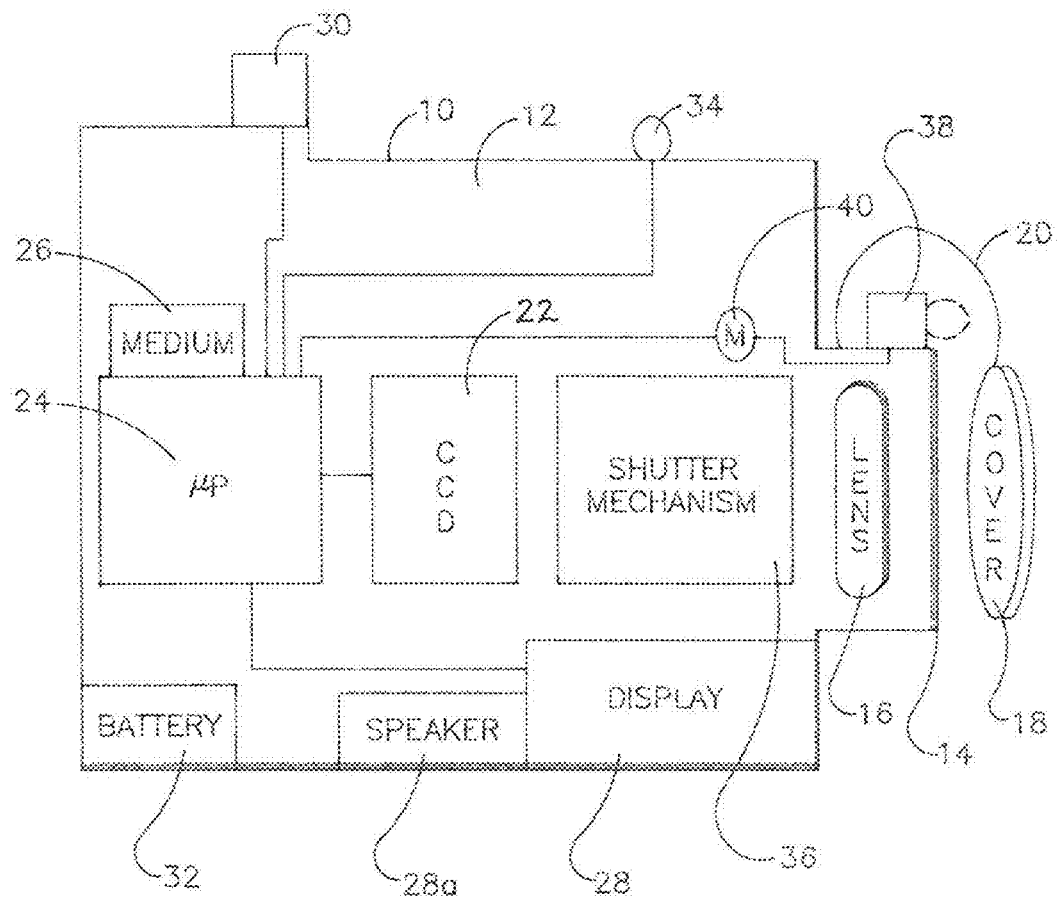
FIG. 1 is a schematic side view of an example camera in an exploded relationship with a lens cover.

Referring initially to FIG. 1, a camera 10 includes a camera body 12 that defines an open lens periphery 14. A camera lens 16 is juxtaposed with the lens periphery 14 inside the camera body 12. A typically plastic lens cover 18 can be engaged in a snapping fit or interface fit or threadably engaged with the lens periphery 14 to substantially block light, debris, etc. from the lens 16. Other ways to engage the lens cover 18 with the lens periphery 14 may be used. The lens cover 18 typically can be disk-shaped. The cover may be connected to the camera body 12 by a lanyard 20.

When the cover 18 is removed from the lens periphery 14, light from outside the camera 12 can pass through the lens 16 to be focused by the lens 16 on an imager 22 such as but not limited to a charge-coupled device (CCD). The imager 22 generates an electrical signal representative of the image in front of the camera and sends the image signal to a processor 24 accessing one or more computer readable storage media 26 such as solid state or disk storage, removable memory, etc.

The processor 24 may also cause the image to be presented on a visual display 28 on the camera body 12. The visual display 28 can be viewed by a person to thereby view the image. The image may be a still image or a video image. One or more speakers 28a may also be provided on the camera housing or other associated therewith.

Imaging may commence when a user manipulates a power button 30, which energizes the components of the camera 12 typically through one or more DC batteries 32. This may cause the camera to begin a video image stream which may be presented on the display 28. To capture an image, a user may manipulate a shutter button 34 on the camera body 12. The processor 24 receives a signal from the shutter button 34 indicating a desire to take a picture and then captures a still image from the video stream by, e.g., storing the still image to the medium 26. Operation of the shutter button 34 and/or power button 30 may cause the processor 24 to configure a shutter mechanism 36 as appropriate to permit imaging in accordance with shutter principles known in the art.

In some implementations a plunger mechanism 38 may be provided on the camera body 12. The plunger mechanism 38 may reciprocate from a retracted configuration (shown in solid in FIG. 1) in which the cover 18 can completely engage the lens periphery 14, and an extended configuration (shown in phantom in FIG. 1), in which the plunger mechanism 38 extends outwardly past the lens periphery 14 to push the lens cover 18 off of the periphery 14. The plunger mechanism 38 may be moved by a small motor 40 that can be controlled by the processor 24 as described further below. Other structure in lieu of the plunger mechanism 38/motor 40 may be used to push the lens cover 18 off the periphery 14, e.g., a spring-loaded mechanism, rotatable mechanism, etc.

Figure 2:
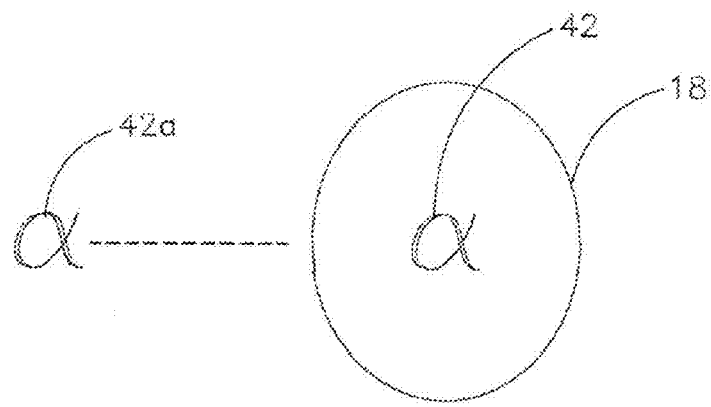
FIG. 2 is a plan view of the inside surface of an example lens cover.

FIG. 2 shows that in an example embodiment the inside surface of the lens cover 18 bears a pattern 42 such as the Greek letter alpha. The pattern 42 may be established by phosphorescent material such as ink that is deposited directly onto the inside surface of the lens cover 18 as by, e.g., etching, or by a phosphorescent sticker 42a (shown in phantom in FIG. 2) that may be provided to a user, who can then apply the sticker to the inside surface. In other embodiments the pattern may be temporal, e.g., if the processor recognizes a totally blacked-out image for a certain period, it can infer that the lens cover remains on the lens periphery 14.

Figure 3:
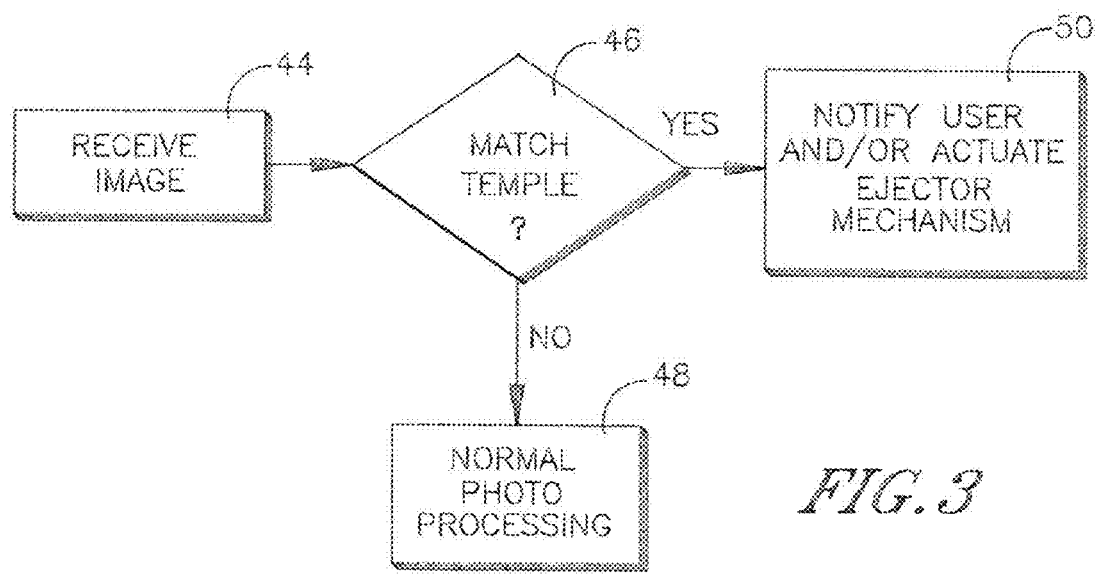
FIG. 3 is a flow chart of example logic in accordance with present principles.

Regardless of the particular pattern, FIG. 3 shows example logic that may be used in accordance with present principles. Commencing at block 44, upon indication from the user that an image is to be taken or captured (by, e.g., manipulation of either button 30 or 34), the image through the lens 16 as detected by the imager 22 is received by the processor 24. It is determined at decision diamond 46 whether the image is recognized as indicating that the lens cover remains in place on the lens periphery. In one example, the processor 24 accesses a template in the storage medium 26 and compares the image to the template. In the present example, the template would be the Greek letter alpha. Thus, the processor software can be upgraded post-sale to execute present principles and a sticker provided to the user to place on the lens cover, or the lens cover can be vended with the pattern pre-sale.

If the image does not match the template within a matching criterion, the logic flows to block 48 wherein the camera executes normal photo processing, it being understood that under the "no" branch from decision diamond 46 the lens cover 18 is not detected as being engaged with the lens periphery 14. On the other hand, if the processor 24 determines that the image from the lens cover 18 matches the template, as it would in the present example when the lens cover 18 covers the lens and the phosphorescent pattern 42 consequently is detected, the logic flows to block 50 in which the processor generates a signal representing that the lens cover remains undesirably engaged with the lens periphery.

The signal generated at block 50 may be used to present a visible warning on the display 28, e.g., a message stating "lens cover still on". Or, it may be used to generate an audible warning on the speaker 28a, e.g., a series of rapid warning beeps. Yet again, in addition to or in lieu of the above warnings the signal may be used to actuate the mechanism 38 to push the lens cover 18 away from the lens periphery 14. Still further, the signal indicating that the lens cover 18 remains engaged with the camera to cover the lens can be used to prevent or otherwise inhibit "auto focus" so that the camera 10 will not attempt to adjust the focus with the lens cover is on, to eliminate unnecessary mechanical work and consequently save battery 32 power.

While the particular CAMERA THAT WARNS LENS COVER STILL ATTACHED is herein shown and described in detail, it is to be understood that the subject matter which is encompassed by the present invention is limited only by the claims.

What is claimed is:

1. A camera comprising:
   a housing holding a lens;
   an imager in the housing to receive light from the lens;
   a processor in the housing; and
   a lens cover removably engageable with the housing to cover and uncover the lens, the lens cover bearing a phosphorescent pattern on an inner surface thereof, the processor generating a first signal indicating that the lens cover is engaged with the housing to cover the lens upon recognition of the pattern, the processor not generating the first signal otherwise.

2. The camera of claim 1, wherein the pattern is established by a sticker.

3. The camera of claim 1, wherein the pattern is established by ink deposited on the inner surface.

4. The camera of claim 1, wherein the processor compares an image represented by signals from the imager to a template to determine whether the lens cover is engaged with the housing.

5. The camera of claim 1, wherein the first signal establishes a visible warning presented on a display associated with the camera.

6. The camera of claim 1, wherein the first signal establishes an audio warning presented on a speaker associated with the camera.

7. The camera of claim 1, wherein the first signal establishes a control signal to cause a mechanism on the camera to push the lens cover away from the camera body.

8. Apparatus comprising:
   a processor;
   a lens; and
   a lens cover movable by a photographer to cover and uncover the lens;
   wherein the processor is programmed to recognize when the lens cover covers the lens and to generate a signal in response representative thereof;
   wherein the lens cover bears a phosphorescent pattern on an inner surface thereof, the processor generating a first signal indicating that the lens cover is engaged to cover the lens upon recognition of the pattern, the processor not generating the first signal otherwise.

9. The apparatus of claim 8, wherein the pattern is established by a sticker.

10. The apparatus of claim 8, wherein the pattern is established by ink deposited on the inner surface.

11. The apparatus of claim 8, further comprising an imager, wherein the processor compares an image represented by signals from the imager to a template to determine whether the lens cover is engaged to cover the lens.

12. The apparatus of claim 8, wherein the first signal establishes a visible warning presented on a display associated with the processor.

13. The apparatus of claim 8, wherein the first signal establishes an audio warning presented on a speaker associated with the processor.

14. The apparatus of claim 8, wherein the first signal establishes a control signal to cause a mechanism on the apparatus to push the lens cover away from the lens.

15. Apparatus comprising:
   a camera lens that can be covered by a lens cover even when a photographer intends to take a picture with the camera; and
   a processor causing a visible or audible warning to the photographer that the lens cover remains over the lens;
   wherein the lens cover bears a phosphorescent pattern on an inner surface thereof, the processor generating a first signal indicating that the lens cover is engaged to cover the lens upon recognition of the pattern, the processor not generating the first signal otherwise.

16. The apparatus of claim 15, wherein the first signal establishes a visible warning presented on a display associated with the processor.

17. The apparatus of claim 15, wherein the first signal establishes an audio warning presented on a speaker communicating with the processor.

18. The apparatus of claim 15, wherein the first signal establishes a control signal to cause a mechanism on the apparatus to push the lens cover away from the lens.

* * * * *